(12) United States Patent
Rippelmeyer et al.

(10) Patent No.: US 10,948,081 B2
(45) Date of Patent: Mar. 16, 2021

(54) DOWNSIZED CVT OIL PUMP ACHIEVED BY SLIP DEVICE

(71) Applicant: Toyota Motor Engineering & Manufacturing North America, Inc., Erlanger, KY (US)

(72) Inventors: Luke A. Rippelmeyer, Canton, MI (US); Nicholas S. Vernon, Brighton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 366 days.

(21) Appl. No.: 15/447,282

(22) Filed: Mar. 2, 2017

(65) Prior Publication Data
US 2018/0252315 A1  Sep. 6, 2018

(51) Int. Cl.
*F16H 61/662* (2006.01)
*F16H 9/14* (2006.01)
(Continued)

(52) U.S. Cl.
CPC ........ *F16H 61/66272* (2013.01); *B60K 17/08* (2013.01); *F16H 9/14* (2013.01);
(Continued)

(58) Field of Classification Search
CPC ........... B60Y 2400/72; F16H 61/66272; F16H 61/0025; F16H 9/14; F16H 9/16; F16H 63/46; F16H 2061/66286; F16H 2061/66277; F16H 2059/6853; F16H 37/084; F16H 37/0846; F16H 37/0853;
(Continued)

(56) References Cited

U.S. PATENT DOCUMENTS 5,007,512 A * 4/1991 Petzold ................. B60W 10/02
192/3.51
5,766,110 A * 6/1998 Kanno ................... F16D 48/066
477/175
(Continued)

*Primary Examiner* — Michael R Mansen
*Assistant Examiner* — Raveen J Dias
(74) *Attorney, Agent, or Firm* — Dinsmore & Shohl LLP

(57) ABSTRACT

A continuously variable transmission, a vehicular powertrain that includes a continuously variable transmission and a method of limiting belt slippage in a continuously variable transmission in a vehicle. The continuously variable transmission includes a pulley assembly, shafts, a clutch and hydraulic system. The hydraulic system is cooperative with both the clutch and the pulley assembly so that hydraulic pressures and associated clamping forces sent to both allow the clutch to preferentially absorb any driving load coming from the axle and wheels that is in excess of the normal load experienced at the continuously variable transmission. This in turn means that any additional load that would ordinarily cause slippage in the belt is instead experienced by the clutch. By providing such a clutch, the pump of the hydraulic system does not need to be oversized in order to provide excess clamping force, as any excess load experienced by the shaft that is coupled to the wheels of the vehicle will be taken up by slippage in the clutch so that slippage-related wear to the belt is avoided.

11 Claims, 4 Drawing Sheets

(51) Int. Cl.

| | | |
|---|---|---|
| *B60K 17/08* | (2006.01) | |
| *F16H 63/46* | (2006.01) | |
| *F16H 9/16* | (2006.01) | |
| *F16H 9/18* | (2006.01) | |
| *F16H 37/08* | (2006.01) | |
| *F16H 61/00* | (2006.01) | |
| *F16H 59/68* | (2006.01) | |
| *F16D 25/10* | (2006.01) | |
| *F16D 48/02* | (2006.01) | |

(52) U.S. Cl.
CPC ............... *F16H 9/16* (2013.01); *F16H 9/18* (2013.01); *F16H 37/0846* (2013.01); *F16H 63/46* (2013.01); *B60Y 2400/72* (2013.01); *F16D 25/10* (2013.01); *F16D 25/14* (2013.01); *F16D 2500/1026* (2013.01); *F16D 2500/10412* (2013.01); *F16H 61/0025* (2013.01); *F16H 2059/6853* (2013.01)

(58) Field of Classification Search
CPC .. F16H 37/086; F16H 2073/0866; F16H 9/00; F16H 9/12; F16H 9/18; B60K 17/08; F16D 2500/10412; F16D 2500/10437; F16D 2500/1026; F16D 2500/70406; F16D 25/10; F16D 25/14
USPC ........................................... 474/18
See application file for complete search history.

(56) References Cited

U.S. PATENT DOCUMENTS

| | | | |
|---|---|---|---|
| 6,135,919 A * | 10/2000 | Shimakura | F16H 57/0434 184/27.2 |
| 6,306,061 B1 | 10/2001 | Inamura et al. | |
| 6,412,617 B1 * | 7/2002 | Spijker | F16D 48/06 192/103 F |
| 7,025,706 B2 | 4/2006 | Katou | |
| 7,654,935 B2 | 2/2010 | Tanaka et al. | |
| 8,414,452 B2 | 4/2013 | Shirasaka et al. | |
| 8,439,798 B2 | 5/2013 | Hanyu et al. | |
| 8,771,141 B2 | 7/2014 | Aoyama et al. | |
| 2001/0005805 A1 * | 6/2001 | Saotome | F16D 48/06 701/67 |
| 2003/0015393 A1 * | 1/2003 | Ries-Mueller | F16D 48/06 192/103 F |
| 2003/0073535 A1 * | 4/2003 | Eguchi | B60W 10/02 475/175 |
| 2013/0041563 A1 * | 2/2013 | Komiya | F16H 61/0021 701/60 |
| 2014/0235381 A1 * | 8/2014 | Yagasaki | F16H 9/125 474/8 |
| 2017/0015301 A1 * | 1/2017 | Yamamoto | B60K 6/48 |
| 2017/0114895 A1 * | 4/2017 | Hattori | F16H 61/66259 |
| 2018/0105162 A1 * | 4/2018 | Katakura | B60K 6/48 |
| 2018/0111604 A1 * | 4/2018 | Inoue | B60K 6/543 |

* cited by examiner

DOWNSIZED CVT OIL PUMP ACHIEVED BY SLIP DEVICE

TECHNICAL FIELD

The present specification relates generally to a pulley-and-belt continuously variable transmission for use with a vehicle, and more particularly to a hydraulically-actuated continuously variable transmission where the actuation force delivered to the pulleys of the continuously variable transmission is sufficient to avoid belt slippage under all load conditions such that an oversized hydraulic fluid pump is not required.

BACKGROUND

A vehicular continuously variable transmission (CVT) typically employs a belt that runs between two sheaved pulleys. Each pulley defines an axially-split construction so that the spacing between the respective halves can be varied by hydraulic, spring or centrifugal means as a way to continuously adjust the radial spacing (and hence the gearing ratio) between the driving pulley that receives rotational power from the vehicle's engine and the driven pulley that delivers rotational power to the vehicle's wheels. The belt is subject to a varying clamping force from the halves of each pulley to prevent slippage under different driving loads where as a general matter, increasing the driving loads require increasing clamping forces.

In the hydraulic-based configuration, a pump working in concert with oil or a related hydraulic fluid supplies the axial clamping force, as well as provides selective clamping force needed to engage one or more clutches that are used to couple the engine to the CVT. Typically, such pumps are oversized beyond their capacity to supply clamping forces under normal driving loads in order to accommodate large spikes in driving loads experienced at the CVT; examples of such a large spike is that associated with driving the vehicle on a rough road or under heavy braking, where higher loads from the vehicle's driven wheels are being fed back to the CVT. This pump oversizing, which is done to avoid the inefficiencies and excessive wear that accompany belt slippage, leads to larger, heavier and more expensive pumps than would otherwise be necessary.

SUMMARY

In one embodiment, a vehicular CVT is disclosed. The CVT includes a pulley assembly, first and second shafts, a clutch and hydraulic system. The pulley assembly includes a driving pulley and a driven pulley rotatably coupled to one another through a belt where each of the pulleys includes a fixed member and a movable member. The movable member is axially split from the fixed member and is actuated along a direction that defines the pulley axis of rotation. The second shaft is rotatably responsive to rotational movement of the driven pulley such that upon receipt of rotational movement from the driven pulley, the second shaft delivers torque to at least one driven wheel through a coupled axle or related mechanism. The clutch is coupled to the second shaft to effect an upper limit of torque being transferred to the pulley assembly from the driven wheel through the axle. The hydraulic system is made up of a pump and a hydraulic fluid that together cause the actuation of the movable pulley sheaves through changes in a clamping force. By such actuation and subsequent axial movement of one sheave relative to the other within a common pulley, a change in the width of a substantially V-shaped opening between the pulley's movable member and fixed member along the pulley axial direction causes a corresponding variation in the effective diameter of the driving and driven pulleys relative to one another; this in turn causes a difference in speed ratios between the pulleys as the belt that rotationally connects them spins about a larger circumference of one pulley and a smaller circumference about the other. In addition, the hydraulic system is cooperative with the clutch that can be used to couple the CVT to the driven axle and wheel (or wheels). Because the clutch effectively absorbs any driving load coming from the axle and wheels that is in excess of the normal load experienced at the CVT, any additional load that would ordinarily cause slippage in the belt of the CVT is instead experienced by the clutch. By providing such a clutch, the pump of the hydraulic system does not need to be oversized in order to provide excess clamping force to the two halves of the driven pulley, as any excess load experienced by the second shaft (such as due to rough road surfaces, braking or the like) will be taken up by slippage in the clutch so that slippage-related wear to the belt is avoided.

In another embodiment, a vehicular drivetrain is disclosed. The drivetrain includes an axle and a CVT configured such that upon receipt of torque from a source (such as an engine) through the CVT, the axle can deliver rotating power to at least one coupled wheel. The CVT includes a pulley assembly, first and second shafts, a clutch and hydraulic system as discussed in conjunction with the previous embodiment. In this way, the hydraulic system and the clutch cooperative with one another and the axle and any coupled wheels to effect an upper limit of torque being transferred to the pulley assembly of the CVT regardless of a load received by the CVT from the axle or wheels. This upper limit substantially corresponds to the load in that any amount of torque generated by the load that exceeds an amount that would cause slippage of the belt relative to the driving and driven pulleys for a given clamping force such that any such excess is applied first to the clutch, thereby effectively capping the amount of torque being delivered from such load to the pulley assembly to no more than that which will maintain the pulley assembly in a no-slippage state of operation. It will be appreciated that the drivetrain may become a powertrain when the source of torque is an engine such as that described herein, and that such powertrain is within the scope of the present disclosure.

In yet another embodiment, a method of limiting belt slippage in a vehicular CVT is disclosed. The method includes arranging the CVT on the vehicle so that the CVT includes a pulley assembly made up of a driving pulley and a driven pulley rotatably coupled to one another through a belt. In addition, the method includes arranging a first shaft and a second shaft to be rotatably coupled to the pulleys of the CVT where the first shaft is coupled to the vehicle's engine (and optionally through an intervening torque converter or related device) to receive motive power torque therefrom, while an intervening clutch is rotatably coupled to the second shaft between the CVT and at least one driven wheel. Furthermore, a hydraulic system is included that is fluidly cooperative with the CVT and clutch so that it can apply a clamping force to at least one of the pulleys. This force must be sufficient to ensure that there is substantially no slippage between the pulleys and the belt during CVT operation. Moreover, operating of the hydraulic system in conjunction with the CVT and clutch is such that slippage of the belt relative to the driving and driven pulleys is avoided during the time that the clamping force is applied, as any load-produced torque that would otherwise be fed back into the CVT from the driven wheel or wheels is intercepted by the clutch. Significantly, the presence of the clutch between the load and the CVT places an upper limit on how much torque is fed back into the driven pulley of the pulley assembly, which in turn means that the clamping force being applied for a particular operational setting will continue to be sufficient to avoid any belt-to-pulley slippage. This is further significant in that this slippage avoidance is ensured despite that fact that the pump or related hydraulic fluid pressurizing device does not need to be oversized beyond its capacity to deliver a suitable level of clamping force for normal vehicular operation. It will be understood that various components that are coupled to the pulley assembly may with equal applicability form part of the CVT, and that regardless of the degree of structural integration, all such variants are deemed to be within the scope of the present disclosure. As such, whether the first and second shafts or clutch are deemed to form a part of the CVT or merely coupled to the CVT is a matter of semantics, and whether they do or do not form a part of the CVT proper will be understood by the context.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein include CVTs and their associated systems where the oil pump that is used to provide a hydraulic clamping force to the halves of each pulley need not be oversized regardless of the driving load. To achieve this, the present disclosure includes placing an a clutch downstream of the CVT, specifically situated between the driven pulley and the vehicle's driven wheels so that the pump can also selectively provide the necessary hydraulic clamping force to this downstream clutch as a way to have the clutch effectively absorb any driving load coming from the driven wheels that is in excess of the normal load experienced at the CVT. More particularly, because the clutch is engaged at the same pressure as that of the CVT under the normal load, any slippage due to an excess driving load from the wheels to the CVT takes place in the clutch rather than the CVT. This in turn prolongs belt life by reducing the wear attendant to such slippage.

Figure 1:
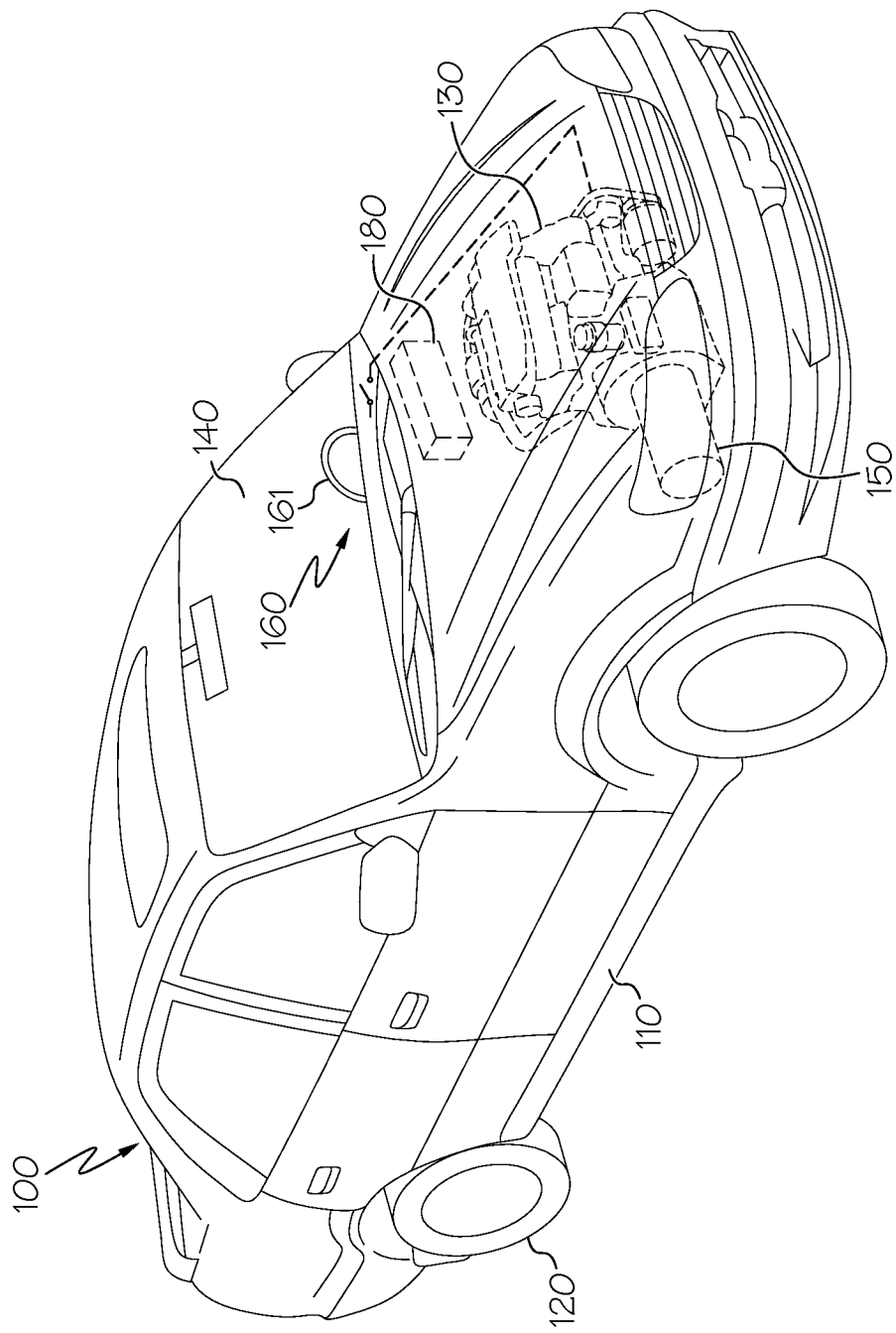
FIG. 1 depicts a notional vehicle in accordance with one or more embodiments shown or described herein.

Referring first to FIG. 1, a vehicle 100 includes a chassis 110 with a plurality of wheels 120 at least one of which is configured as a driving wheel to propel the vehicle 100 upon receipt of suitable motive power. Chassis 110 may either be of body-on-frame or unibody construction, and both configurations are deemed to be within the scope of the present disclosure. A motive power unit 130 such as a conventional internal combustion engine (ICE), battery pack, fuel cell stack or a hybrid combination of one or more of the above may be situated in or on the chassis 110 to provide a vehicular source of torque or propulsive power to the vehicle 100. As shown, the engine 130 is situated underneath a hood that is placed at the fore end of vehicle 100. A passenger compartment 140 is formed inside the chassis 110 and serves not only as a place to transport passengers and cargo, but also as a place from which a driver may operate vehicle 100. A transmission in the form of a CVT 150 is coupled to the engine 130 such that together they form a portion of a powertrain through which a torque may be applied to some or all of the wheels 120. Within the present context, the term "powertrain" is used to describe a motor and a drivetrain where the latter is understood to include the various components that convey torque to the driving wheel or wheels. Although shown as driving the front wheels 120 in FIG. 1, it will be appreciated that one or more drive shafts and associated coupling, axles 121, differentials 122 or the like may extend along the vehicle 100 longitudinal axis such that the rear wheels 120 are driven, either in addition to or instead of the front wheels 120, and that all variants are deemed to be within the scope of the present disclosure. For example, if the vehicle 100 is configured to have front-wheel drive, the torque converter may be in the form of a clutch, along with a transaxle that includes a gearset, final drive, differential, drive shafts and constant-velocity joints to each wheel, while if the vehicle 100 is configured to have rear-wheel drive, the torque converter is serially coupled to a transmission, propeller shaft (i.e., main drive shaft) and rear axle with final drive and differential. Further within the present context, an axle 121 encompasses any shaft-like rotating member that is connected to the one or more wheels 120 and acts as a coupling between the wheels 120 and a source of torque such as the engine 130, drive shaft (discussed later) or the like. As such, it may be configured as a rear axle in a rear-wheel drive embodiment of vehicle 100, as a transaxle (or drive shaft or related subcomponent) in a front-wheel drive embodiment of vehicle 100 or as both in an all-wheel drive embodiment of vehicle 100. A guidance apparatus 160 (which may include, among other things, steering wheel 161, accelerator (or throttle) pedal 162, brake pedal 163, shifter 164 or the like) is used in cooperation with the wheels 120, engine 130, CVT 150 and other systems to control movement of the vehicle 100. A hydraulic system 170 provides pressurized fluid (such as oil or the like) to control actuation of the CVT 150, as well as other systems, such as the brakes (not shown) that are responsive to the brake pedal 163. In one form, the hydraulic system 170 may be configured as either one central system or as numerous distributed systems each with a dedicated circuit to the components that they are in control of; either variant is deemed to be within the scope of the present disclosure. Control of electrical signals to or from the various electrical-based components (including some of the components within CVT 150) may be provided by one or more electronic control units (ECUs, also referred to herein as a controller) 180. As with the hydraulic system 170, ECU 180 may be configured as one central system or as numerous distributed systems. Many of the various components making up vehicle 100 will be discussed in more detail below.

Figure 2:
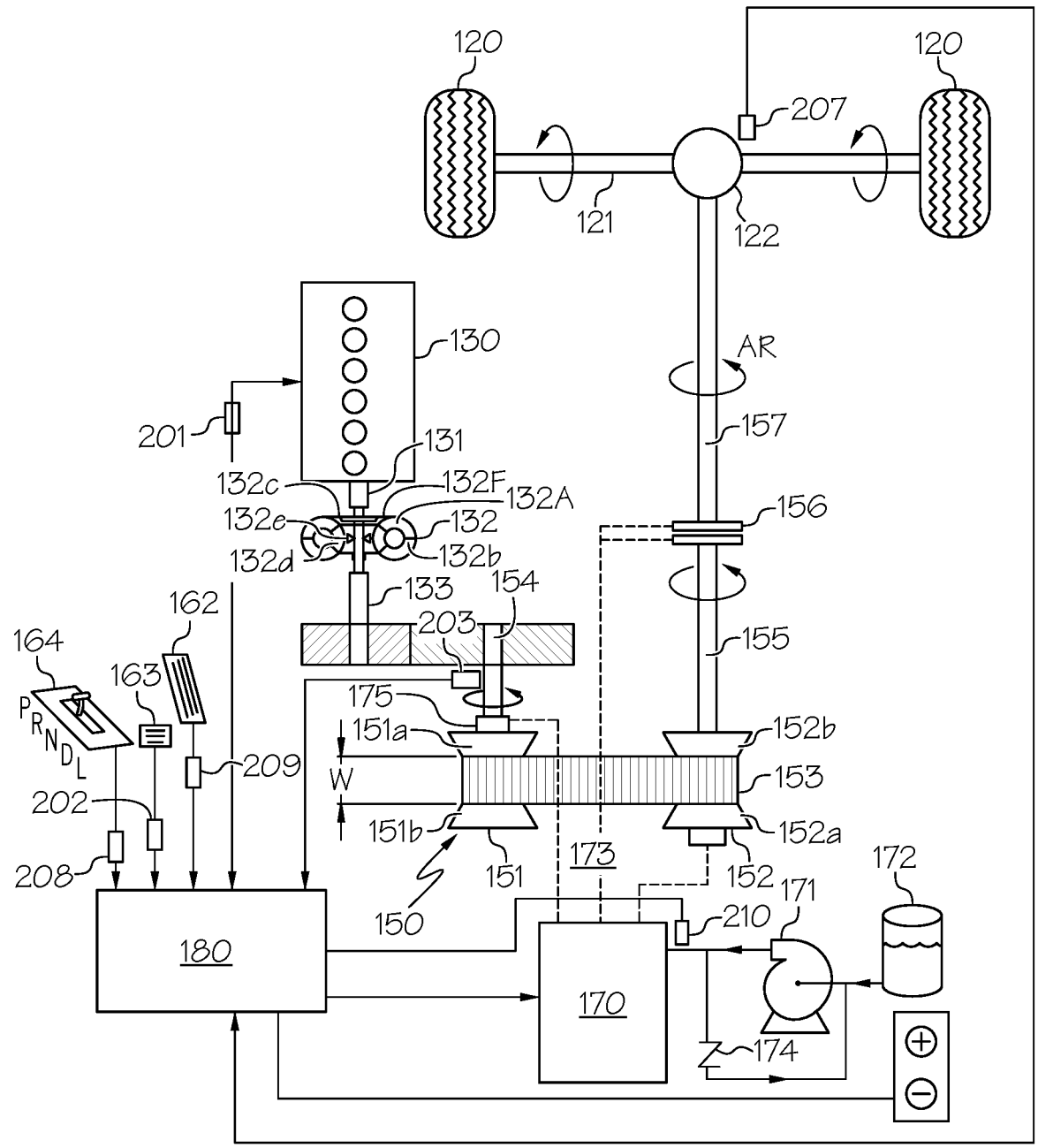
FIG. 2 depicts a block diagram of a CVT system placed on conjunction with other powertrain components and their hydraulic and controller counterparts of the vehicle of FIG. 1 in accordance with one or more embodiments shown or described herein.

Referring next to FIG. 2, a diagrammatic representation of the cooperation between the engine 130, the CVT 150, the hydraulic system 170 and ECU 180 (as well as other systems) in order to provide motive control to vehicle 100 is shown. Engine 130 generates a torque that is transmitted through a rotating output 131 that is in the form of a shaft or related rotating member. Together, the engine 130 and the output 131 act as a source of rotational torque that can provide propulsive power to the vehicle 100 when delivered through other drivetrain components to one or more of the wheels 120. As shown, the output 131 acts as an input shaft for torque converter 132. By the operation of the torque converter 132 that is intermediate the engine 130 and the CVT 150, the torque generated by the engine 130 may be limited or otherwise modified in a manner different than if no such intervening structure were present. In one form, the torque converter 132 (which is generally similar to a fluid coupling) is of a toroidal configuration, and includes (or is otherwise cooperative with) other components to transmit the rotational power from the output 131 of engine 130 to the CVT 150; such additional components may include one or more planetary gearsets (for example, the well-known Ravigneaux gearset) and shafts for a forward-and-reverse switching mechanism that is responsive to selector 164, brake bands and disc clutches to control the planetary gearset, hydraulic servos and pistons to actuate the bands and clutches, and a source of pressurized oil such as that provided by the hydraulic system 170 along with vales and various flow control mechanisms. The torque converter 132 provides a torque increasing function and includes a pump impeller 132A connected to the engine output 131, a turbine wheel 132B connected with the engine output 131 through a housing 132C and a stator 132D coupled through a one-way roller clutch, sprag clutch or the like 132E. An additional lockup clutch 132F is included to form a direct coupling between engine output 131 and a torque converter output shaft 133 (also referred to herein as the first shaft) for those operating conditions where torque increasing is not required so that when fully engaged, the pump impeller 132A and the turbine wheel 132B are rotated as a unit.

As will be discussed in more detail below, an oil pump 171 (such as that which makes up a portion of the hydraulic system 170) produces hydraulic pressures and associated clamping forces for control CVT 150 shifting through selective increases or decreases in clamping force imparted to belt 153. In addition, the oil pump 171 controls engagement of the stator and clutch, as well as to supply lubricant to various other components. In one form, the planetary gearset includes a sun gear integrally coupled to the torque converter output shaft 133, while a carrier is integrally coupled to the engine output 131 or a related CVT 150 input shaft. The carrier and the sun gear are selectively connected to each other through a suitable forward-drive clutch, while a reverse-drive brake is selectively fixed to the planetary gearset housing, where each of the clutch and reverse-drive brake are selectively engaged with pressurized fluid from the hydraulic system.

The hydraulic system 170 includes an oil pump 171 and an oil reservoir 172, as well as conduit 173 with valves, regulators and related flow control mechanisms (such as check valve 174, as well as poppet-based regulator valves, solenoid-based flow control valves, relay valves or the like (not shown)) to selectively deliver pressurized oil or related working fluid to various components of the CVT 150 through conduit 173. Hydraulic cylinders 175 are fluidly coupled to the flow control mechanisms in order to apply as-needed fluid pressure to various pulleys 151, 152 of the CVT 150 as discussed in more detail below. In one form, the oil pump 171 is configured to receive electric power, while in another, mechanical power (such as through a power takeoff shaft from engine 130). To provide the selective movement of the pulleys 151, 152, the suction of the oil pump 171 receives oil from the reservoir 172 (which in one form may be an oil pan or the like) and pressurizes it for delivery through one or more solenoid valves, regulator valves or the like in order to supply the working fluid to one or more of the hydraulic cylinders 175 that causes axial movement of one or more sheaves (as will be discussed in more detail below). The hydraulic system 170 also controls the operation of the torque converter 132, as well as its related forward-and-reverse switching mechanism and its brake bands and disc clutches. As will be discussed in more detail below, in one form, the ECU 180 may be used to provide control logic to adjust the clamping forces from the oil pump 171 to the various CVT 150 components.

CVT 150 includes a pair of sheaved pulleys 151, 152 that are referred to as the driving (or primary) pulley and the driven (or secondary) pulley, respectively. A belt 153 defines a V-shaped cross-sectional profile along its length to define continuous, closed-loop path by traveling in the generally complementary-shaped V-shaped operating diameter that is formed by the conically-adjacent placement of the pulleys 151, 152 to one another. Together, the driving pulley 151, driven pulley 152 and belt 153 make up the pulley assembly. A pair of shafts 154, 155 each of which define an axis of rotation $A_R$ are secured respectively to the driving pulley 151 and the driven pulley 152. The adjustable operating diameter of each of the pulleys 151, 152 is made possible by axially-split construction made up of halves, including a movable member 151A, 152A and a fixed member 151B, 152B, respectively. Within the present context, the distinction between which half is movable and which half is fixed isn't between whether the half rotates (as both halves of the driving pulley 151 do when subjected to a rotational torque from the torque converter output shaft 133, or as both halves of the driven pulley 152 do when delivering a rotational torque to the second—or driven pulley—shaft 155), but which of the halves translates along the lengthwise direction that defines the axis of rotation $A_R$ of the respective one of the shafts 154, 155. In this way, the two halves of each pulley 151, 152 can be moved closer together or farther apart to adjust the operational diameter. As mentioned above, each of the halves define a conically-shaped sheave in order to form a V-groove between the movable member 151A, 152A and the fixed member 151B, 152B. The hydraulic cylinders 175 are placed on the back surface of the movable members 151A, 152A to act as hydraulic actuators such that when hydraulic pressure is applied to the hydraulic cylinders 175, their clamping force in the form of axial thrust causes the widths of the V-shaped grooves to change, thereby impacting how far up or how low down in the respective V-shaped grooves the belt 153 rides. In addition, a belt clamping pressure is imparted by the output-side hydraulic cylinder 175 to ensure that the clamping force imparted to belt 153 is sufficient to not to cause slippage of the belt 153 within the pulleys 151, 152. It is noted that the hydraulic pressure being supplied to the hydraulic cylinder 175 and the ensuing clamping force is sufficient to tighten the belt 153 by the pulleys 151, 152, but is not enough to transmit torque or related motive power.

A clutch 156 is arranged on the driven pulley shaft 155. In one form, clutch 156 functions in a manner generally similar to that of the torque converter 132 in that it relies on fluid coupling. In one form, the clutch 156 may be a mechanical device such that the actuation force being delivered may be in the form of a mechanical linkage such as a release fork may be used to achieve selective engagement. In such a configuration, clutch 156 includes at least a flywheel, clutch disc, pressure plate, springs, housing for the pressure plate and linkage (such as the aforementioned release fork). In another form, the clutch 156 may be configured as a torque converter or related fluid reduction gear-like coupling similar to torque converter 132 mentioned above. Also in a manner similar to the torque converter 132, the clutch 156 may include a selective locking feature for use in certain rotational environments (specifically, when the speeds of the rotational speeds of the driven shaft 155 and the final drive shaft 157 are nearly identical as a way to avoid slippage and a resulting loss of efficiency. The clutch 156—by the presence of a stator—can be used to maintain ample torque, even under operating conditions that may be expected to produce high slippage. The power that is output to the driven pulley shaft 155 is then transmitted to the one or more drive wheels 120 through a final drive shaft 157 and one or more of a differential 122 and axle 121. Thus, the pump 171, actuators 175 and a hydraulic fluid of the hydraulic system 170 are cooperative with the pulley assembly and the clutch 156, whereupon application of hydraulic pressure to the movable member 151A, 152A of at least one of the pulleys 151, 152 through the respective one of the actuators 175, a change in clamping force that adjusts the width W of a substantially V-shaped opening between the movable members 151A, 152A and the fixed members 151B, 152B along the direction that defines the axis of rotation $A_R$ causes a corresponding variation in the effective diameter of the driving and driven pulleys 151, 152 relative to one another in order to obtain different speed ratios therebetween, the hydraulic system 170 and the clutch 156 cooperative with one another to effect an upper limit of torque being transferred to the pulley assembly regardless of a load on the driven pulley shaft 155, such upper limit substantially corresponding to a maximum amount of torque that avoids slippage of the belt 153 relative to the driving and driven pulleys 151, 152. Although not shown, in one form, additional hydraulic cylinders that are similar to hydraulic cylinders 175 may be placed in cooperation with the clutch 156 in order to apply as-needed fluid pressure for selective engagement or disengagement of the clutch. Moreover, such hydraulic cylinders may also be responsive to control signals received from ECU 180.

Figure 3:
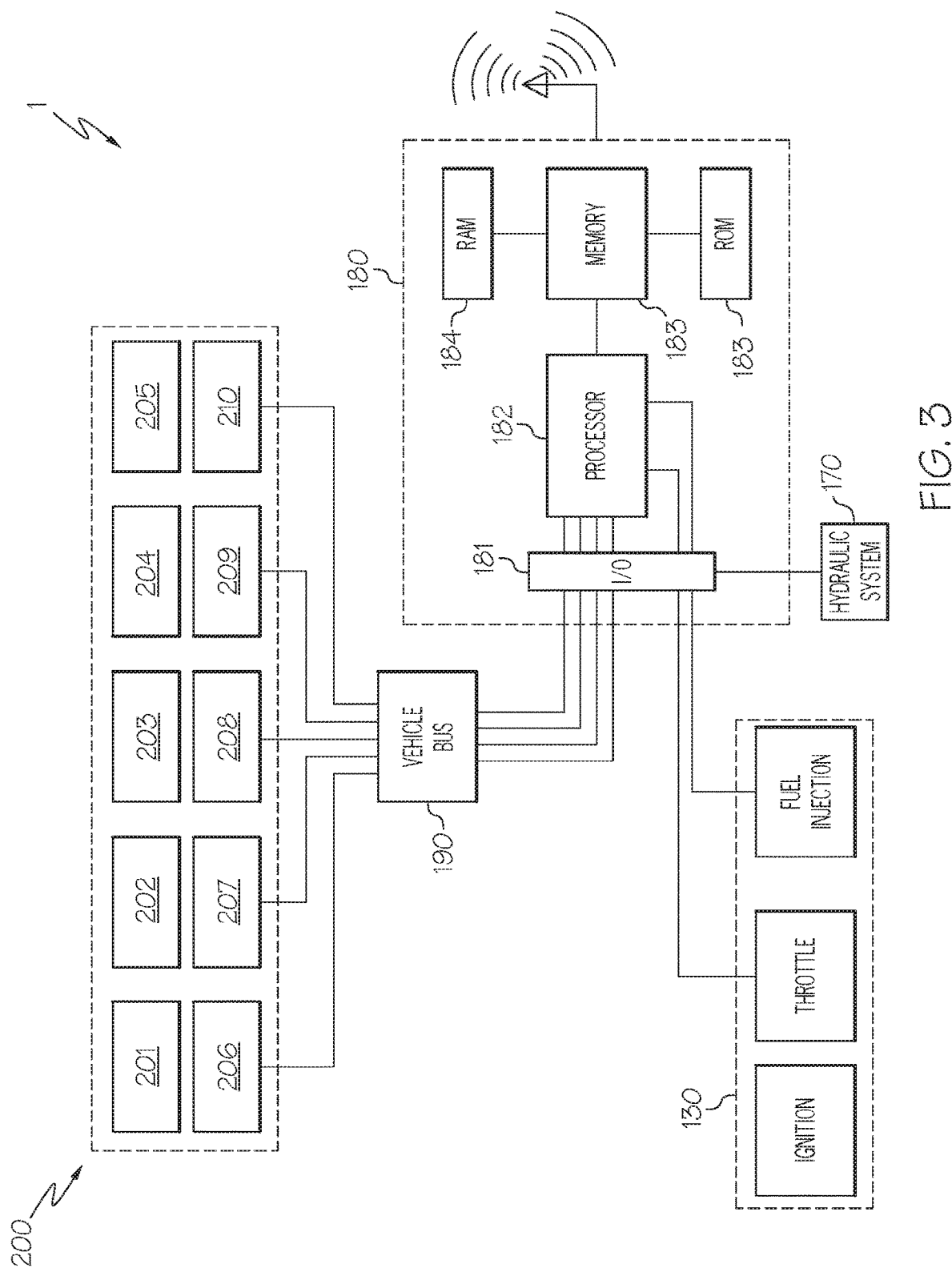
FIG. 3 depicts an electronic control unit used to control the actuation of the pulleys of the CVT through the hydraulic system in accordance with one or more embodiments shown or described herein.

Referring next to FIG. 3, a diagrammatic representation of ECU 180 is shown. Although shown notionally as being within the passenger compartment 140 or the engine compartment, it will be appreciated that the ECU 180 is situated in any suitable location within vehicle 100 where access to wiring, harnesses or busses is readily available. In addition, it will be appreciated that ECU 180 may be one of many such control units within the vehicle 100, depending on the desired degree of integration or autonomy among such control units. Control of electrical signals to or from the various electrical-based components (including some of the components within CVT 150) may be provided by the ECU 180. In one form, the ECU 180 is operable to receive a command from the driver (such as through the accelerator pedal 163, brake pedal 164 or the like) to actuate the hydraulic system 170. In one form, the ECU 180 may be operable to actuate one or more valves, pressure regulators or related flow control mechanisms that are discussed in more detail elsewhere herein. In one form, the ECU 180 controls the various valves based on signals acquired by one or more sensors 200, including coolant temperature sensor 201, brake fluid pressure sensor 202, engine speed sensor 203, input shaft speed sensor 204, oil temperature sensor 205, belt slip sensor 206, vehicle speed sensor 207, selector sensor 208, throttle/accelerator sensor 209, oil pressure sensors 210 or the like.

ECU 180 is provided with one or more input/output (I/O) 181, microprocessor (CPU) 182, read-only memory (ROM) 183, random-access memory (RAM) 184, which are respectively connected by a bus 190 to provide connectivity for a logic circuit for the receipt of signal-based data from sensors 200, as well as the sending of commands or related instructions. Various algorithms and related control logic may be stored in the ROM 183 or RAM 184 in manners known to those skilled in the art. Thus, in one form, CPU 182 can be made to operate on control logic for the hydraulic system 170 such that individually and together the various components making up ECU 180 define a logic circuit needed to provide the various forms of hydraulic functions as discussed herein. The control logic may be embodied in an algorithm or related program code that can be manipulated or otherwise operated on by CPU 182 and then conveyed via I/O ports 181 to the wiring (such as that which makes up a portion of bus 190) that delivers electric current to the hydraulic system 170.

The ECU 180 receives various signals from the various sensors 200 such that it may send a suitable control signal to the hydraulic system 170 for actuation of the hydraulic actuator 175 or related valves in order to change the relative diameter settings on pulleys 151 and 152. As mentioned above, ECU 180 may be configured as a centralized controller, or as numerous distributed systems. By way of example, in a configuration where ECU 180 is made up of numerous individual controllers, each can operate in a generally autonomous manner such that hardware and control logic may be specifically configured for the particular operation of one or more disparate components or systems to which it is coupled. Thus, a first ECU 180 may be a controller for engine 130, while another ECU 180 may be a controller for shifting the ratios of the pulleys 151, 152 of the CVT 150, while another ECU 180 still is for brake controller, and another still for belt clamping force settings. It will be appreciated that these and related variants of ECU 180 are all within the scope of the present disclosure.

In operation, once the engine 130 is started, the oil pump 171 receives a supply of oil from the reservoir 172 for delivery to (among other places) the hydraulic actuators 175 that are coupled to the pulleys 151, 152 of CVT 150. As mentioned above, the hydraulic system 170 in general and the oil pump 171 in particular are sized to provide a sufficient hydraulic pressure to ensure a clamping force that prevents slippage of the belt 153 relative to the pulleys 151, 152. Even more particularly, the hydraulic pressure being delivered one or both of the movable members 151A, 152A is the same as that of the clutch 156; in this way, should a spike in torque be imparted from the wheels 120 through the axle 121, differential 122 and final drive shaft 157 that would exceed the ability of the clamping force (which is preferably based on acquired data from sensors 200 and the subsequent control signals from ECU 180) to maintain sufficient friction between the belt 153 and pulleys 151, 152, the clutch 156 acts to interrupt such a spike so that concomitant slippage is absorbed by the clutch 156 rather than the CVT 150.

In this way, the oil pump 171—which otherwise would have to be oversized in order to ensure against belt 153 slippage in the CVT 150 during these periods of high shaft loading—need only be of sufficient capacity to supply the hydraulic pressure for clamping forces under normal driving loads or conditions. Within the present context, so-called "normal" loads, conditions or the like are those associated with the operation of a vehicle 100 in situations for which such vehicle 100 is designed. By way of example, if vehicle 100 is a passenger sedan or coupe, normal loads would be those associated with traversing paved roadways (such as highways, primary and secondary streets or the like) with passengers, cargo or other items weighing up to the gross vehicle weight rating (GWVR) of vehicle 100. Likewise, under normal driving loads or conditions, propulsive torques being transmitted from the engine 130 and through the drivetrain and to the driven wheels 120 for such a sedan or coupe would be those associated with maneuvers such as stopping, starting, accelerating (including passing other vehicle on a highway), turning, as well as those used in extreme temperature or other weather environments, as well as those associated with elevation changes (such as driving on roadways through mountainous terrain or the like). In this way, the oil pump 171 may be sized (by voltage used, current drawn, horsepower rating, net positive suction head (NPSH), pressure differential produced or any other convenient measure of pump capacity) to ensure that is can deliver suitable pressures and related clamping forces to the CVT 150 to meet the design objectives set by the vehicle 100 manufacturer (i.e., original equipment manufacturer (OEM)) for such normal loads and operating conditions.

Such a pump 171 may then become smaller, lighter and less expensive than those used in conventional CVT systems. Because the oil pump 171 is already delivering such amount of hydraulic pressure to the hydraulic actuators 175, it requires no additional capacity to also supply the same pressure for engaging the clutch 156. Thus, for a given pressure needed for the CVT 150 clamping force, the belt 153 will not slip unless a load greater than a corresponding threshold driving load is experienced at the CVT 150; because the clutch 156 is engaged at the same pressure, the clutch 156 is only capable of transmitting the threshold driving load (and no more) from the wheels to the CVT 150. This upper limit substantially corresponds to a maximum amount of torque that avoids slippage of the belt relative to the driving and driven pulleys 151, 152 for a given amount of clamping force being applied to a corresponding movable member 151A, 152A. As such, the driving loads exceeding the threshold driving load will not be experienced at the CVT 150, and slippage is prevented. Stated another way, the pump 171 is not oversized relative to its intended function during these normal loads and operating conditions. Accordingly, the pump 171 has a hydraulic pressure-generating capacity that is no more than that needed to ensure that the clamping force imparted to the pulleys 151, 152 is sufficient to avoid the slippage between the pulleys 151, 152 and the belt 153 during movement of the belt 153 even when a load imparted to the clutch 156 exceeds this hydraulic pressure-generating capacity. While it is understood that such a pump with excess capacity could be used to avoid such slippage within the pulley assembly, it is preferable within the present context to use the clutch 156 to instead reduce the size of such pump so that the weight, vehicle packaging, cost and complexity of any such excess capacity is avoided.

Figure 4:
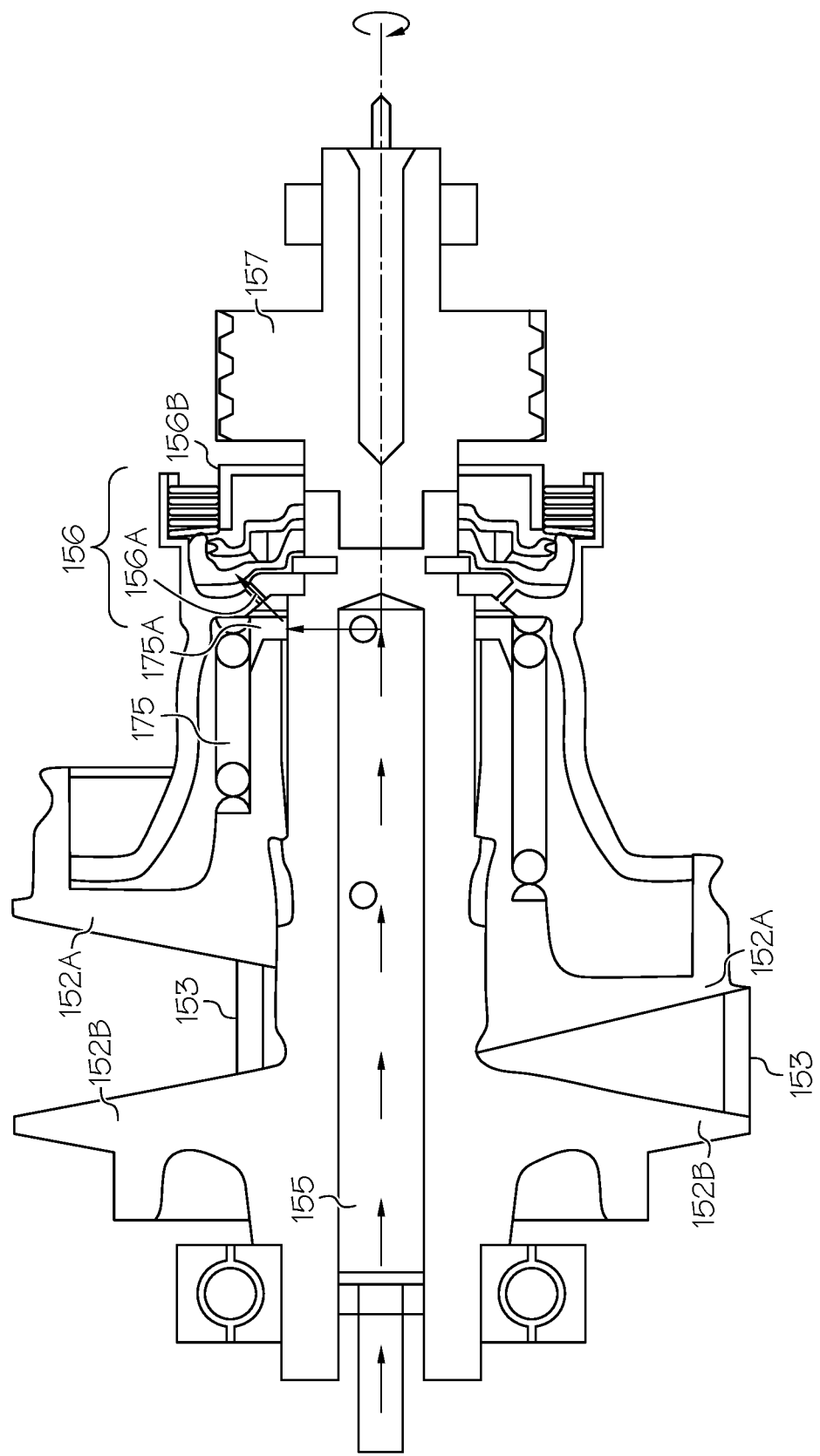
FIG. 4 depicts a detailed view of the oil travel path through the hollow center of the driven pulley shaft and toward the hydraulic actuators of the CVT and clutch that are coupled to the driven pulley shaft in accordance with one or more embodiments shown or described herein.

Referring next to FIG. 4 in conjunction with FIG. 2, details associated with a portion of the internal structure of one of the pulleys 152 and the clutch 156 are shown. In particular, FIG. 4 shows a portion of the flow of oil through the hollow center of the driven pulley shaft 155. Such flow of oil is used to provide the hydraulic actuation of the movable member 152A of driven pulley 152 and piston 156B of clutch 156. As can be seen, a shared pathway includes passages 175A and 156A that provide the oil to the respective hydraulic actuators of the CVT 150 and clutch 156 that are coupled to the driven pulley shaft 155. This shared (or common) pathway of the oil helps ensure the same amount of hydraulic pressure is being delivered to the clutch 156 as one or both of the movable members 151A, 152A. Thus, because an excessive torque being delivered through the wheels 120, axle 121, differential 122 and final drive shaft 157 first encounters the clutch 156 rather than the CVT 150, any ensuing slippage will likewise take place initially at the clutch 156.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. For example, the system and methods using the system may be implemented in one or both of software and hardware, and that all variations on the embodiments of such system and method as discussed herein will be understood to be within the scope of the present disclosure. Furthermore, the order of steps associated with such methods may be changed, while various features of the system may be combined, added, removed, reordered, modified or the like, and still be within the scope of the present disclosure. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicular continuously variable transmission comprising:
   a pulley assembly comprising a driving pulley and a driven pulley rotatably coupled to one another through a belt, each of the pulleys comprising a fixed member and a movable member, each of the movable members being actuated along a direction that defines a pulley axis of rotation;
   a first shaft coupled to the driving pulley such that upon receipt of torque from a source thereof, the first shaft selectively conveys such torque to the driving pulley;
   a second shaft coupled to the driven pulley such that upon receipt of torque from the driven pulley, the second shaft generates torque for at least one vehicular wheel;
   a clutch coupled to the second shaft between the driven pulley and the at least one vehicular wheel; and
   a hydraulic system comprising a pump, actuators and a hydraulic fluid cooperative with the pulley assembly and the clutch, the hydraulic system configured to supply a hydraulic pressure to the movable member of at least one of the pulleys and the clutch, wherein the hydraulic pressure supplied to the movable member of at least one of the pulleys is substantially the same as the hydraulic pressure supplied to the clutch;

wherein the clutch is configured to slip when a load imparted to the clutch from the at least one vehicular wheel exceeds the hydraulic pressure supplied to the clutch; and wherein the hydraulic pressure-generating capacity of the pump is no more than that needed to ensure that the hydraulic pressure from the hydraulic system to the movable member of at least one of the pulleys is sufficient to apply a clamping force to the movable member of at least one of the pulleys to avoid slippage between the pulleys and the belt during movement of the belt under normal driving loads.

2. The transmission of claim 1, further comprising a controller and a plurality of sensors signally coupled to the controller such that upon acquisition of data by at least one of the plurality of sensors, the controller makes changes in hydraulic pressure to effect different speed ratios between the pulleys.

3. The transmission of claim 2, wherein a hydraulic pressure generated by the hydraulic system for application of the clamping force to the movable member of at least one of the pulleys is substantially the same as a hydraulic pressure generated by the hydraulic system delivered to the clutch for operation thereof.

4. The transmission of claim 3, wherein the plurality of sensors is selected from a group consisting essentially of coolant temperature sensor, brake fluid pressure sensor, engine speed sensor, input shaft speed sensor, oil temperature sensor, belt slip sensor, vehicle speed sensor, selector sensor, accelerator sensor, oil pressure sensor, current sensor associated with measuring at least one operational parameter of the pulley assembly, first shaft, second shaft, clutch or hydraulic system, and voltage sensor associated with measuring at least one operational parameter of the pulley assembly, first shaft, second shaft, clutch or hydraulic system.

5. A vehicular drivetrain comprising:
an axle configured such that upon receipt of torque from a source thereof, the axle delivers rotating power to at least one wheel coupled thereto; and
a continuously variable transmission coupled to the axle and comprising:
a pulley assembly comprising a driving pulley and a driven pulley rotatably coupled to one another through a belt, each of the pulleys comprising a fixed member and a movable member, each of the movable members being actuated along a direction that defines a pulley axis of rotation;
a first shaft coupled to the driving pulley such that upon receipt of torque from the source thereof, the first shaft selectively conveys such torque to the driving pulley;
a second shaft coupled to the driven pulley such that upon receipt of torque from the driven pulley, the second shaft generates torque for at least one vehicular wheel;
a clutch coupled to the second shaft between the driven pulley and the at least one vehicular wheel; and
a hydraulic system comprising a pump, actuators and a hydraulic fluid cooperative with the pulley assembly and the clutch, the hydraulic system configured to supply a hydraulic pressure to the movable member of at least one of the pulleys and the clutch, wherein the hydraulic pressure supplied to the movable member of at least one of the pulleys is substantially the same as the hydraulic pressure supplied to the clutch;

wherein the clutch is configured to slip when a load imparted to the clutch from the at least one vehicular wheel exceeds the hydraulic pressure supplied to the clutch; and wherein the hydraulic pressure-generating capacity of the pump is no more than that needed to ensure that the hydraulic pressure from the hydraulic system to the movable member of at least one of the pulleys is sufficient to apply a clamping force to the movable member of at least one of the pulleys to avoid slippage between the pulleys and the belt during movement of the belt under normal driving loads.

6. The drivetrain of claim 5, further comprising a torque converter disposed between the continuously variable transmission and the source of torque.

7. The drivetrain of claim 5, further comprising a controller and a plurality of sensors signally coupled to the controller such that upon acquisition of data by at least one of the plurality of sensors, the controller makes changes in hydraulic pressure to effect different speed ratios between the pulleys.

8. The drivetrain of claim 7, wherein the plurality of sensors is selected from a group consisting essentially of coolant temperature sensor, brake fluid pressure sensor, engine speed sensor, input shaft speed sensor, oil temperature sensor, belt slip sensor, vehicle speed sensor, selector sensor, accelerator sensor, oil pressure sensor, current sensor associated with measuring at least one operational parameter of the axle, pulley assembly, first shaft, second shaft, clutch or hydraulic system, and voltage sensor associated with measuring at least one operational parameter of the axle, pulley assembly, first shaft, second shaft, clutch or hydraulic system.

9. A method of limiting belt slippage in a continuously variable transmission in a vehicle, the method comprising:
arranging the continuously variable transmission on the vehicle, the transmission comprising a pulley assembly comprising a driving pulley and a driven pulley rotatably coupled to one another through a belt;
arranging a first shaft and a second shaft to be rotatably coupled to the transmission;
arranging a clutch to be rotatably coupled to the second shaft between the driven pulley and at least one vehicular wheel; and
arranging a hydraulic system comprising a pump, actuators and a hydraulic fluid to be fluidly cooperative with the transmission and the clutch;
supplying a hydraulic pressure from the hydraulic system to the clutch and at least one of the pulleys to apply a clamping force to the at least one of the pulleys, wherein the hydraulic pressure supplied to the at least one of the pulleys is substantially the same as the hydraulic pressure supplied to the clutch;
coupling an engine to the transmission such that upon operation of the engine, torque from the engine is delivered to the transmission through the first shaft and used to rotate the driving pulley; and
operating the hydraulic system and the clutch such that slippage of the belt relative to the driving and driven pulleys is avoided during the time that the clamping force is applied to at least one of the pulleys;
wherein the clutch is configured to slip when a load imparted to the clutch from the at least one vehicular wheel exceeds the hydraulic pressure supplied to the clutch; and wherein the hydraulic pressure-generating capacity of the pump is no more than that needed to ensure that the hydraulic pressure from the hydraulic system to the at least one of the pulleys is sufficient to apply a clamping force to the at least one of the pulleys to avoid slippage between the pulleys and the belt during movement of the belt under normal driving loads.

10. The method of claim 9, wherein operating the hydraulic system is done through a controller and a plurality of sensors signally coupled to the controller such that upon acquisition of data by at least one of the plurality of sensors, the controller makes changes in hydraulic pressure to effect different speed ratios between the pulleys.

11. The method of claim 10, wherein the plurality of sensors is selected from a group consisting essentially of coolant temperature sensor, brake fluid pressure sensor, engine speed sensor, input shaft speed sensor, oil temperature sensor, belt slip sensor, vehicle speed sensor, selector sensor, accelerator sensor, oil pressure sensor, current sensor associated with measuring at least one operational parameter of the engine, axle, pulley assembly, first shaft, second shaft, clutch or hydraulic system, and voltage sensor associated with measuring at least one operational parameter of the engine, axle, pulley assembly, first shaft, second shaft, clutch or hydraulic system.

\* \* \* \* \*